United States Patent [19]

Schenk et al.

[11] Patent Number: 4,930,608
[45] Date of Patent: Jun. 5, 1990

[54] TORQUE CONVERTER AND CLUTCH CONTROL WITH PIEZOELECTRIC DEVICES

[75] Inventors: Donald E. Schenk, Vandalia; Jon E. Miller, Spring Valley, both of Ohio

[73] Assignee: General Motors Corporation, Detroit, Mich.

[21] Appl. No.: 348,366

[22] Filed: May 8, 1989

[51] Int. Cl.⁵ .................. F16D 47/02; F16D 43/00
[52] U.S. Cl. ........................... 192/3.29; 192/3.3; 192/56 F; 192/83; 192/84 R; 192/101
[58] Field of Search .............. 192/101, 83, 3.29, 3.3, 192/31, 56 F, 84 R, 84 E

[56] References Cited

U.S. PATENT DOCUMENTS

| | | | |
|---|---|---|---|
| 3,734,251 | 5/1973 | Annis et al. | 192/3.3 |
| 4,167,993 | 9/1979 | Vukovich et al. | 192/3.3 |
| 4,334,602 | 6/1982 | Armour et al. | 192/56 F |
| 4,360,090 | 11/1982 | Wonn | 192/3.3 |
| 4,636,679 | 1/1987 | Glett et al. | 192/30 R |

FOREIGN PATENT DOCUMENTS 2076908 12/1981 United Kingdom .............. 192/3.29

Primary Examiner—Leslie A. Braun
Assistant Examiner—David A. Testardi
Attorney, Agent, or Firm—Donald F. Scherer

[57] ABSTRACT

A torque converter and clutch assembly has a piezoelectric control portion. One piezoelectric device is subjected to the transient torques transmitted to the clutch, and generates a signal in response to the transient torque. Another piezoelectric device is electrically connected with the first piezoelectric device and is expandable in response to the electric signal to initiate clutch disengagement and provide clutch slip to thereby reduce the transmission of transient torque spikes.

3 Claims, 2 Drawing Sheets

TORQUE CONVERTER AND CLUTCH CONTROL WITH PIEZOELECTRIC DEVICES

BACKGROUND OF THE INVENTION

This invention relates to torque converter and clutch assemblies and controls therefore, and more particularly, to such assemblies and controls wherein disengagement of the clutch is initiated in response to rapid torque changes.

SUMMARY OF THE INVENTION

It is an object of this invention to provide an improved control for a torque converter and clutch assembly, wherein clutch disengagement is initiated by electrically interconnected piezoelectric devices in response to a transient torque signal of a predetermined value.

It is another object of this invention to provide an improved control for a torque converter and clutch assembly, wherein the control has one piezoelectric device subjected to transient torque transmission which causes the generation of an electrical signal which is directed to a second piezoelectric device for initiating clutch disengagement in response to the signal.

These and other objects and advantages of the present invention will be more readily apparent from the following specification and drawings.

DESCRIPTION OF EXEMPLARY EMBODIMENTS

Figure 1:
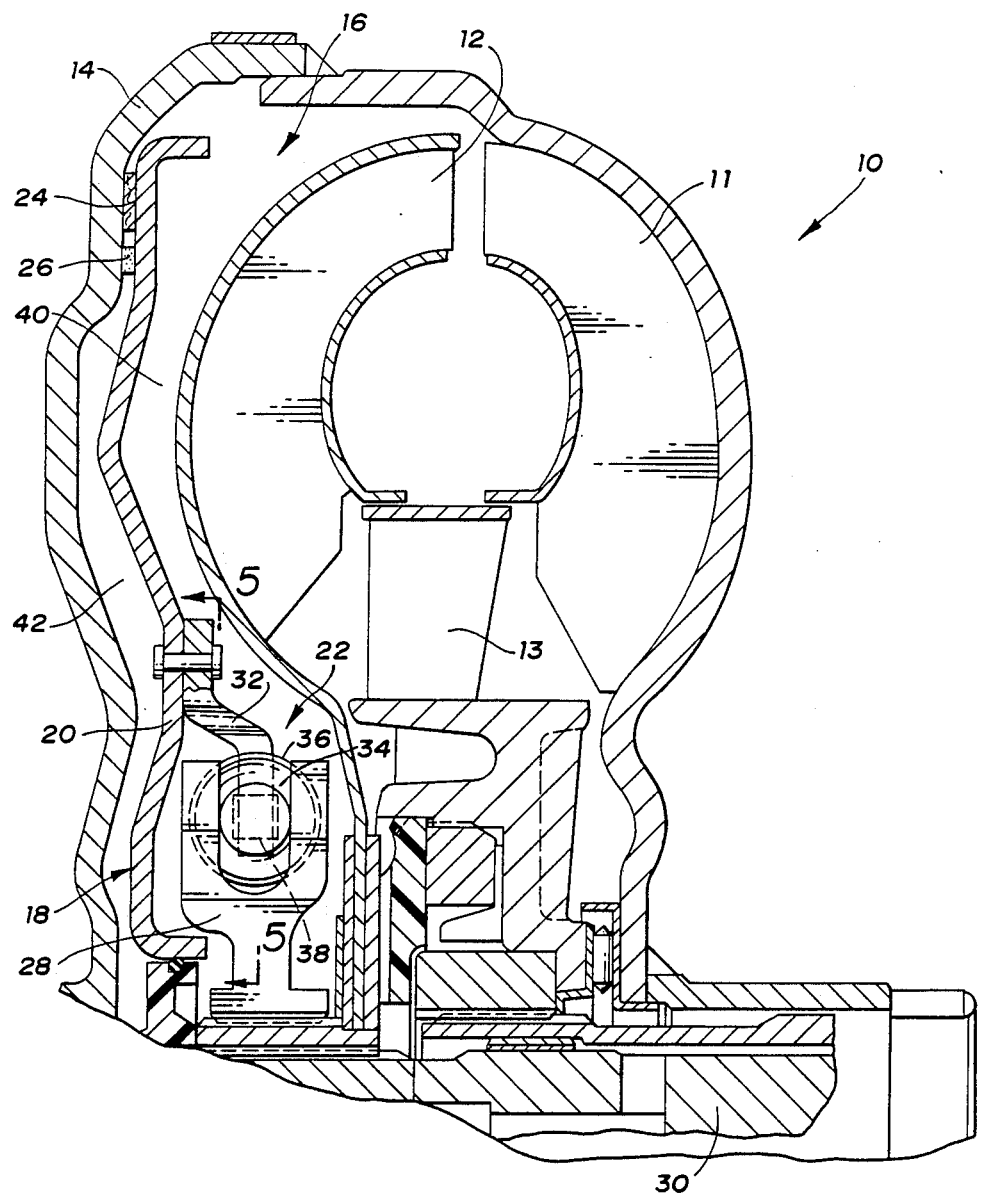
FIG. 1 is a sectional elevational view of a torque converter and clutch assembly incorporating the present invention.

FIG. 1 shows a torque converter 10 having an impeller 11, a turbine 12 and a stator 13. The impeller 11 is secured to an input shell or housing 14 which is driven by in internal combustion engine, not shown.

A converter clutch space 16 is formed between the turbine 12 and the input shell 14. Disposed within this space 16 is a torque converter clutch assembly 18, which consists of a clutch plate 20 and a damper assembly 22. The clutch plate 20 has affixed thereto a friction disc 24 and a piezoelectric element 26. The damper assembly 22 has inner hubs 28 which are drivingly connected to a transmission input shaft 30. The torque converter turbine 12 is also connected to the shaft 30.

The torque converter 10 is a conventional three element torque converter unit which, as is well known, receives power from an engine in the form of torque and speed, and delivers this power to a multispeed planetary transmissions connected to the shaft 30. The transmission can be any of the well known multispeed units.

Figure 2:
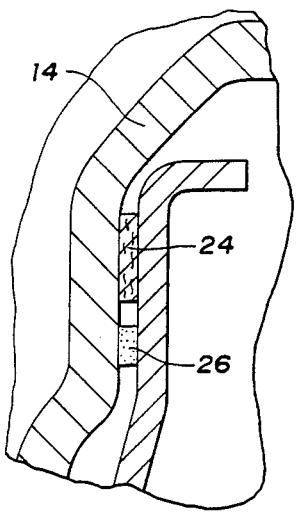
FIG. 2 is an enlarged view of a portion of FIG. 1.

The damper assembly 22, as seen in FIG. 2, includes drive tangs 32 which are drivingly connected to the clutch plate 20 and the hub 28 which is connected to the shaft 30. Disposed between each tang 32 and hub 28 is one or more compression spring members 34. These compression spring members will permit relative rotary motion to occur between the tangs 32 and the hub 28 to assist in absorbing torsional vibrations imposed upon the torque converter clutch.

Also disposed between the spring 34 and the tang 32 is a spring plate 36 and a piezoelectric device 38. The piezoelectric device 38 is electrically connected by wiring, not shown, with the piezoelectric device 26. As is well known, piezoelectric devices have a characteristic which causes a voltage to be induced therein when a stress is applied to the piezoelectric device. In this current control mechanism, the piezoelectric device 38 has imposed thereon the operating torques that are input to the power transmission through the torque converter clutch 18. Thus, as the torque level of the clutch 18 increases rapidly, a predetermined voltage level will be established within the piezoelectric device 38.

Piezoelectric devices also have a characteristic in that the material will physically expand as a result of the voltage potential being applied to the material. The expansion of the piezoelectric material is proportional to the applied voltage. The piezoelectric device 26 is subjected to the voltage induced in the piezoelectric device 38 and will therefore expand accordingly.

The torque converter clutch 18 divides the space 16 into an apply or engagement chamber 40 and a release or disengagement chamber 42. These chambers 40 and 42 are selectively pressurized with fluid to provide controlled engagement and disengagement of the torque converter clutch 18. When the engagement chamber 40 is pressurized and the disengagement chamber 42 exhausted, the clutch 18 is applied, such that the torque delivered by the engine is communicated through the clutch plate 20 and damper 22 of the shaft 30, effectively bypassing the torque converter 10. Hydraulic control mechanisms for selectively controlling the fluid flow to a torque converter and clutch assembly are well known and have been commercially available for considerable time.

The damper assembly 22 is effective to reduce most of the torsional vibrations imposed thereon to a level which will not be perceived by the operator. However, there are some torsional spikes or transient forces which will pass through the damper if a device, such as the present invention, is not included.

When a significantly high torque spike is imposed on the damper 22, the piezoelectric device 38 will be induced to create a voltage potential which is imposed on the piezoelectric device 26. The piezoelectric device 26 will expand rapidly in response to this voltage thereby separating the friction disc 24 from the input shell 14, such that clutch disengagement is initiated and torsional spikes will not longer be transmitted through the friction interface. Since the torque spike is essentially instantaneous, the stress on piezoelectric device 38 will rapidly reduce, permitting the voltage induced thereby to reduce, such that piezoelectric device 26 will contract permitting re-engagement of the friction disc 24.

The separation between friction disc 24 and the input shell 14 when the piezoelectric device 26 is expanded, is very small. However, it is sufficiently large to permit a fluid film to be established which will permit slippage between the friction disc 24 and the input shell 14. It is well known that a slipping clutch will not transmit transient torque spikes.

Figure 3:
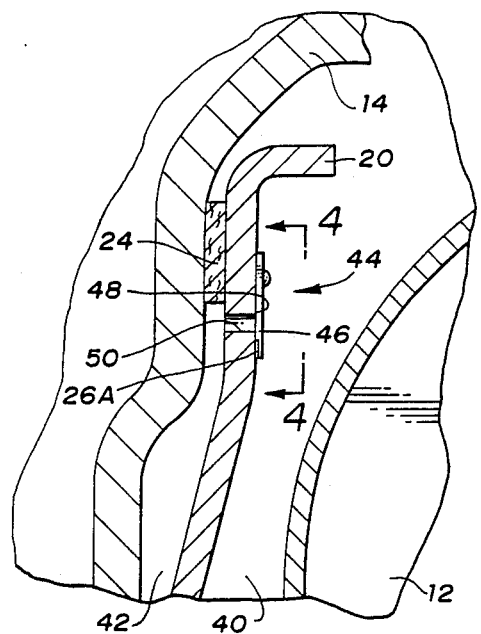
FIG. 3 is an alternate embodiment of the present invention using a valving arrangement.
Figure 4:
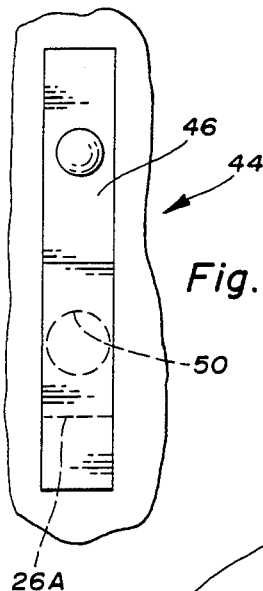
FIG. 4 is a view looking in the direction of line 4—4 in FIG. 3.
Figure 5:
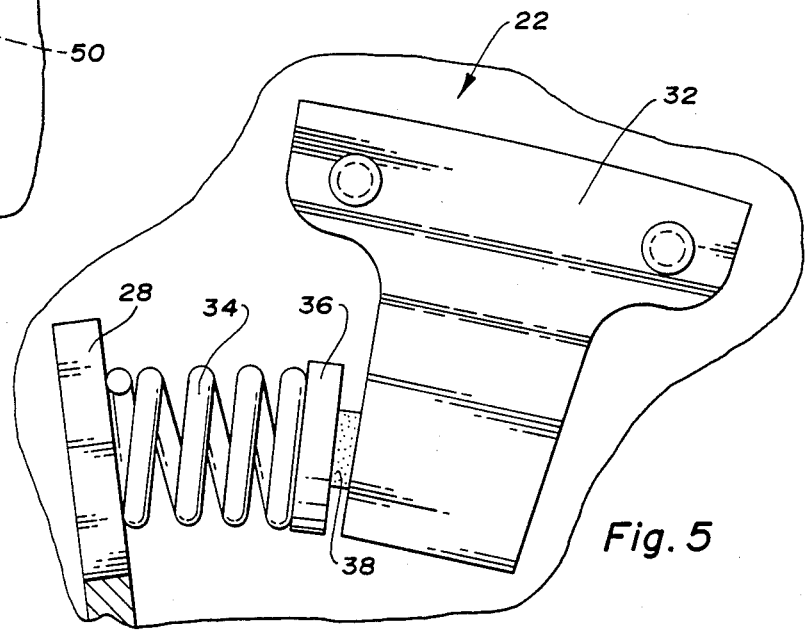
FIG. 5 is a view taken along line 5—5 of FIG. 1.

FIGS. 3 and 4 depict an alternate embodiment of the invention, wherein the clutch plate 20 has secured thereto, a valve 44 which includes a spring arm 46 and a valve seat 48. The spring arm 46 holds the valve seat 48 against the clutch plate 20 to close an aperture 50 formed in the clutch plate 20. This aperture 50 is positioned to permit fluid communication between the engagement chamber 40 and the disengagement chamber 42, whenever the valve assembly 44 is open.

A piezoelectric device 26A is secured to either the spring arm 46 or the clutch plate 20, such that upon expansion thereof, the valve seat 48 will be lifted from the aperture 50 permitting fluid communication therethrough. Therefore, when a significant torsional spike is imposed upon the piezoelectric device 38, the piezoelectric device 26A will be expanded permitting fluid communication between the chambers 40 and 42. Fluid communication between these chambers will initiate disengagement of the torque converter clutch 18, such that further transmission of the torsional spike will cease.

With the exception of the piezoelectric devices 26, 26A and 28 and the valve 44, the damper 22 and clutch assembly 18 may be constructed in accordance with many of the damper and clutch assemblies currently available.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A torque converter clutch assembly and control comprising: torsional damper means disposed in the torque converter clutch and being subjected therein to transient torsional impulses; an engagement chamber means for said torque converter clutch; a disengagement chamber means for said torque converter clutch; first piezoelectric means disposed on said damper means in a position to be stressed upon the transmission of a transient torsional impulse for generating a voltage proportional to the time rate of change of the transient torsional impulse; and a second piezoelectric means disposed in one of said engagement and disengagement chamber means and being electrically connected with said first piezoelectric means for receiving a voltage signal therefrom and being expandable upon a predetermined voltage to initiate disengagement of said torque converter clutch.

2. A torque converter clutch assembly and control comprising: torsional damper means disposed in the torque converter clutch having an input member subjected to transient torsional impulses and an output member; an engagement chamber means for said torque converter clutch; a disengagement chamber means for said torque converter clutch; first piezoelectric means disposed on said damper means in a position to be stressed upon the transmission of a transient torsional impulse at a location to receive the transient torsional impulse before the transient torsional impulse is delivered to the output member for generating a voltage proportional to the time rate of change of the transient torsional impulse; and a second piezoelectric means disposed in one of said engagement and disengagement chamber means and being electrically connected with said first piezoelectric means for receiving a voltage signal therefrom and being expandable upon a predetermined voltage to initiate disengagement of said torque converter clutch.

3. A torque converter clutch assembly and control comprising: torsional damper means disposed in the torque converter clutch having an input member subjected to transient torsional impulses and an output member; a fluid pressure engagement chamber means for said torque converter clutch; a fluid pressure disengagement chamber means for said torque converter clutch; first piezoelectric means disposed on said damper means in a position to be stressed upon the transmission of a transient torsional impulse at a location to receive the transient torsional impulse before the transient torsional impulse is delivered to the output member for generating a voltage proportional to the time rate of change of the transient torsional impulse; valve means for controlling fluid communication between said engagement and disengagement chambers; and a second piezoelectric means disposed in one of said engagement and disengagement chamber means and being electrically connected with said first piezoelectric means for receiving a voltage signal therefrom and being expandable upon a predetermined voltage to actuate said valve means to initiate disengagement of said torque converter clutch.

* * * * *